Patented Feb. 4, 1947

2,415,079

UNITED STATES PATENT OFFICE 2,415,079

BASIC-ALKYL ESTERS AND THEIR SALTS

Frederick F. Blicke, Washtenaw County, Mich., assignor to Regents of the University of Michigan, Ann Arbor, Mich., a corporation of Michigan No Drawing. Application February 26, 1944, Serial No. 524,085

4 Claims. (Cl. 260—469)

This invention is concerned with certain basic-alkyl esters of alpha-naphthyl-acetic acid and alpha-naphthyl-acetic acids substituted with a hydrocarbon radical on the alpha aliphatic carbon atom and salts thereof, and is particularly directed to (a) esters having the formula

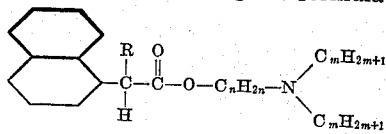

wherein R represents hydrocarbon or hydrogen, $n$ is an integer from 2 to 4, inclusive, and $m$ is an integer from 1 to 4, inclusive, and (b) the acid salts of such basic-alkyl esters. Members of this class of compounds have been found to have value as antispasmodics and as intermediates in the preparation of complex organic derivatives. The free dialkylamino-alkyl esters are oily liquids readily soluble in many common organic solvents, difficultly soluble in water, and distilling with some decomposition at high temperatures and under reduced pressure. The acid salts of these basic-alkyl esters are solids at ordinary temperatures.

In the foregoing formula, R represents such hydrocarbon radicals as lower alkyl, aryl, and cycloalkyl. The alkyl radicals and residues represented by $-C_mH_{2m+1}$ and $C_nH_{2n}-$, respectively, are straight chain in structure.

The new compounds may be prepared by reacting a suitable acid, e. g. alpha-naphthyl-acetic acid, alpha-(alpha-naphthyl)-phenylacetic acid, alpha-(alpha-naphthyl) - phenylpropionic acid, alpha-(alpha-naphthyl) - cyclohexylacetic acid, alpha-(alpha-naphthyl)-propionic acid, or alpha-(alpha-naphthyl)-normalbutyric acid, with a suitable omega-dialkylamino-alkyl halide. This is conveniently accomplished by heating together substantially equimolecular proportions of the acid and halide, preferably in the presence of a low boiling organic solvent, e. g. isopropyl alcohol, butyl alcohol, benzene, etc. The solvent is thereafter evaporated out of the mixture to obtain the basic-alkyl ester hydrohalide as a crystalline residue. This residue may be washed with a non-solvent such as ether and purified by recrystallization from suitable solvent or solvent mixture if desired.

While the foregoing procedure is productive of the hydrohalide of the dialkylamino-alkyl ester of the acid selected, the free ester may be obtained therefrom by treatment of this hydrohalide with ammonia or other suitable alkaline material. Acid salts other than the hydrohalides may be prepared from the free basic-alkyl esters by reaction of the latter with the corresponding acid or acid anhydride, or by treatment of the hydrohalide with a selected salt of the desired acid to bring about double decomposition, but under such conditions as not to induce hydrolysis of the ester.

An alternate method for the preparation of the present compounds consists of reacting thionyl chloride with a selected alpha-naphthyl-acetic or hydrocarbon substituted acetic acid to produce the corresponding acid chloride. The latter compound is reacted with an excess of a suitable omega-dialkylamino-alkanol in an inert solvent, e. g. benzene. This is conveniently carried out by heating the mixture to the boiling temperature of the solvent and under reflux for the period of time necessary to accomplish the reaction. The mixture may then be filtered to separate precipitated dialkylamino-alkanol hydrochloride. The filtrate from this operation may be evaporated under reduced pressure to separate solvent and obtain the free basic-alkyl ester of the alpha-naphthyl-acetic acid. Such crude residue may be further purified by dispersion in dilute aqueous hydrochloric acid and extraction with ether. The aqueous layer is separated and made alkaline with sodium carbonate solution. The precipitated ester base is then extracted with ether, and the extract washed with water to remove traces of the dialkylamino-alkanol. The washed extract may then be evaporated to obtain the purified basic-alkyl ester as a residue. For preparation of the salts of this ester, either the crude or purified residue of the basic-alkyl ester may be treated with a suitable acid or acid anhydride, preferably while dissolved in a non-polar solvent such as diethyl ether. For preparation of the hydrohalides it is sufficient to pass gaseous hydrogen halide through a solution of the base in suitable solvent. The ester hydrohalide is thereby precipitated and may be separated by filtration. The resulting solid compound may be further purified by recrystallizing from alcohol-ether mixtures or other suitable solvent.

The preferred embodiment of the invention consists of the hydrochlorides of the basic-alkyl esters having the generic formula

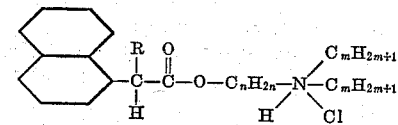

wherein R, $n$ and $m$ have the values heretofore given. These hydrochlorides are relatively high melting crystalline solids, difficultly soluble in most organic solvents, and soluble in water.

The alpha-naphthyl-acetic, alpha-(alpha-naphthyl)-propionic, and alpha-(alpha-naphthyl)-phenylacetic acids employed as reactants in the preparation of certain of the compounds of the present invention are known.

The alpha-(alpha-naphthyl)-butyric, pentanoic, and hexanoic acids may be prepared from diethyl alpha-naphthylmalonate. In this operation, the latter compound is reacted with powdered metallic sodium in benzene and thereafter with ethyl, propyl, or butyl iodide. Any unreacted sodium is subsequently destroyed by the addition of alcohol to the mixture. Diethyl ether and water are then added in appreciable quantity to the mixture, and the ether-benzene layer separated. The latter is washed with aqueous sodium thiosulfate and distilled to obtain the diethyl alkyl-alpha-naphthylmalonate corresponding to the alkyl iodide employed. The diethyl alkyl-alpha-naphthylmalonate is reacted with alcoholic potassium hydroxide, the alcohol distilled from the mixture under reduced pressure, and the residue dissolved in water, cooled, and neutralized with hydrochloric acid. 2-(alpha-naphthyl)-2-alkyl-malonic acid is thereby precipitated. This product is separated and heated to 180° C. to accomplish decarboxylation and obtain the desired alpha-(alpha-naphthyl)-butyric, pentanoic, or hexanoic acid. Such crude product may be further purified according to known procedures.

The alpha-(alpha-naphthyl)-propionic acid melts at 148°–149° C. Alpha-(alpha-naphthyl)-normalbutyric acid melts at 86°–87° C. Alpha-(alpha-naphthyl)-normalpentanoic acid is an oil boiling at 190° C. at 4 millimeters pressure. Alpha-(alpha-naphthyl)-normalhexanoic acid melts at 64°–65° C. and boils at 183° C. at 3 millimeters pressure. Alpha-(alpha-naphthyl)-phenylacetic acid melts at 139°–140° C. The omega-dialkylamino-alkyl chlorides and omega-dialkylamino-alkanols employed in the preparation of the new compounds are known derivatives.

The following examples illustrate the invention with respect to the preparation of certain of the basic-alkyl esters and their salts but are not to be construed as limiting:

Example 1

9.65 grams (0.045 mole) of alpha-(alpha-naphthyl)-butyric acid and 6.1 grams (0.045 mole) of beta-diethyl-amino-ethyl chloride were dissolved in 50 milliliters of anhydrous isopropyl alcohol, and the solution heated to boiling and under reflux for 14 hours. The resulting mixture was warmed on a steam bath to evaporate off the isopropyl alcohol and obtain a viscous oily residue. This residue was dissolved in anhydrous ethyl acetate with warming. Upon cooling, a crystalline precipitate was formed. The mixture was filtered and the residue air-dried to obtain 13.3 grams of beta-diethylamino-ethyl alpha-(alpha-naphthyl)-normalbutyrate hydrochloride melting at 117°–119° C.

Example 2

A portion of the hydrochloride as obtained in Example 1 was dissolved in water and the solution made alkaline with 10 per cent sodium carbonate solution. The alkaline mixture was extracted with anhydrous diethyl ether and the ether extract dried over magnesium sulfate. The extract was then warmed to evaporate off the ether, and obtain beta-diethylamino-ethyl alpha-(alpha-naphthyl)-normalbutyrate as a viscous straw-colored oil boiling at 140° C. at 0.02–0.03 millimeter pressure.

Example 3

10.5 grams (0.04 mole) of alpha-(alpha-naphthyl)-phenylacetic acid and 5.98 grams (0.04 mole) of gamma-diethyl-amino-propyl chloride were dissolved in 50 milliliters of anhydrous isopropyl alcohol and the solution heated to boiling temperature and under reflux for 14 hours. Benzene was then evaporated out of the mixture by warming on a steam bath and the residue dissolved in 50 milliliters of water. This solution was extracted with ether, and the aqueous residue made alkaline with 10 per cent sodium carbonate solution. The aqueous alkaline product was then extracted with anhydrous diethyl ether, and the extract dried over anhydrous magnesium sulfate. The dry solution was warmed to evaporate the ether and obtain gamma-diethylamino-propyl alpha-(alpha-naphthyl)-phenylacetate as a viscous yellow oil boiling at 192° C. at 0.05 millimeter pressure.

Example 4

The free basic-alkyl ester as obtained in Example 3 was dissolved in 100 milliliters of petroleum ether (boiling at 30°–40° C.) and dry hydrogen chloride gas bubbled into and through the solution to precipitate the hydrochloride. The precipitate was separated and recrystallized from a mixture of anhydrous isopropyl alcohol and isopropyl ether to obtain gamma-diethylamino-propyl alpha-(alpha-naphthyl)-phenylacetate hydrochloride melting at 112°–114° C.

Example 5

By substituting other suitable reactants for those shown in the preceding examples, closely related compounds have been prepared. The following are representative:

Beta-diethylamino-ethyl alpha-naphthyl-acetate hydrochloride melting at 128°–130° C. This compound was prepared from alpha-naphthyl-acetic acid and beta-diethylamino-ethyl chloride.

Gamma-diethylamino-propyl alpha-naphthyl-acetate hydrochloride melting at 110°–111° C. This compound was prepared from alpha-naphthyl-acetic acid and gamma-diethylamino-propyl chloride.

Beta-diethylamino-ethyl alpha-(alpha-naphthyl)-propionate hydrochloride melting at 98°–100° C. This compound was prepared by reacting together beta-diethylamino-ethyl chloride and alpha-(alpha-naphthyl)-propionic acid.

Gamma-diethylamino-propyl alpha-(alpha-naphthyl)-propionate hydrochloride melting at 90°–94° C. This compound was prepared by reacting alpha-(alpha-naphthyl)-propionic acid with gamma-diethylamino-propyl chloride.

Gamma-diethylamino-propyl alpha-(alpha-naphthyl)-normalbutyrate hydrochloride melting at 97°–98° C. This compound was prepared by reacting together gamma-diethylamino-propyl chloride and alpha-(alpha-naphthyl)-normalbutyric acid.

Beta-diethylamino-ethyl alpha-(alpha-naphthyl)-phenylacetate hydrochloride melting at 124°–126° C. This compound was prepared by reacting together alpha-(alpha-naphthyl)-phenylacetic acid and beta-diethylamino-ethyl chloride.

In a similar fashion alpha-(alpha-naphthyl)-normalpentanoic acid and alpha-(alpha-naphthyl)-normalhexanoic acid may be reacted with omega-dialkylamino-alkyl halides to obtain such compounds as beta-diethylamino-ethyl alpha-(alpha-naphthyl)-normal pentanoate and its hydrochloride and gamma-diethylamino-propyl alpha-(alpha-naphthyl)-normalhexanoate and its hydrochloride and hydrobromide. By substituting other omega-dialkylamino-alkyl halides for those shown in the foregoing examples, compounds such as delta-diethylamino-normalbutyl alpha-(alpha-naphthyl)-propionate hydrochloride, beta-dipropylamino-ethyl alpha-(alpha-naphthyl)-normalbutyrate, beta-dipropylamino-ethyl alpha-(alpha-naphthyl)-normalbutyrate hydrochloride, beta-dinormalbutylamino-ethyl alpha-(alpha-naphthyl)-phenylacetate-hydrochloride, gamma-dipropyl-amino-propyl alpha-naphthyl-acetate hydrobromide, gamma-dinormalbutylamino-propyl alpha-(alpha-naphthyl)-propionate hydrochloride, gamma-dinormalpropylamino-normalbutyl alpha-(alpha-naphthyl)-normalbutyratehydrochloride, gamma-dinormalbutylamino-propyl alpha-(alpha-naphthyl)-phenylacetate hydrochloride, etc. may be formed.

Other salts which may be prepared by reacting the free omega-dialkylamino-alkyl esters obtained in accordance with the teaching of the preceding examples with suitable acids and acid anhydrides include beta-diethylamino-ethyl alpha-naphthyl-acetate metho-sulfate, gamma-diethylaminopropyl alpha-(alpha-naphthyl)-propionate hydroiodide, betadipropylamino-ethyl alpha-(alpha-naphthyl)-normalbutyrate hydroacetate, delta-diethylamino-normalbutyl alpha-(alpha-naphthyl)-phenylacetate neutral sulfate, gamma-diethylamino-propyl alpha-(alpha-naphthyl)-normalbutyrate tartrate, etc.

While the foregoing examples have been primarily concerned with the preparation of omega-dialkylamino-alkyl esters of alpha-naphthyl-acetic, alpha-(alpha-naphthyl)-propionic, alpha-(alpha-naphthyl)-normalbutyric, and alpha-(alpha-naphthyl)-phenylacetic acids and their salts, closely related derivatives falling within the scope of the present invention may be obtained through similar operation with such compounds as alpha-(alpha-naphthyl)-cyclohexylacetic acid, alpha-(alpha-naphthyl)-phenylbutyric acid, alpha-(alpha-naphthyl) - normalhexenoic-delta-4 acid, etc. or their acid chlorides. By reacting such acids with beta-diethylamino-ethyl chloride, gamma-diethylamino-propyl chloride, beta-dinormalbutylamino-ethyl bromide, etc. or the acid chlorides with the corresponding basic alkanols, the following basic-alkyl esters and their salts may be obtained: beta-diethylamino-ethyl alpha-(alpha-naphthyl)-cyclohexylacetate and its hydrochloride, gamma-dinormalbutylamino-propyl alpha-(alpha-naphthyl)-normalhexanoate hydrobromide, beta-dipropylaminoethyl alpha-(alpha-naphthyl)-phenylpropionate hydrochloride, delta-dinormalbutylamino-normalbutyl alpha-(alpha-naphthyl)-normalhexenoate-delta-4 hydrochloride, beta-dipropylaminoethyl alpha-(alpha-naphthyl)-phenylbutyrate hydrochloride, etc.

Especially preferred embodiments of the present invention are the omega-dialkylamino-alkyl alpha-(alpha-naphthyl)-propionates and phenylacetates, and particularly the hydrochlorides thereof. While all of the compounds hereis disclosed are adapted to be employed as active constituents of antispasmodic compositions, the indicated propionates and phenylacetate derivatives have been found to be especially effective. Representative of the results obtained with these derivatives is the effect exerted upon isolated rabbit intestine according to the method of Magnus. Thus beta-diethylamino-ethyl alpha-(alpha-naphthyl)-propionate hydrochloride and gamma-diethylamino-propyl alpha-(alpha-naphthyl)-phenylacetate hydrochloride at dilutions of between 1 to 1,000,000 and 1 to 2,000,000 in water were effective in relaxing the unstimulated intestine segment. Gamma-diethylamino-propyl alpha-(alpha-naphthyl)-propionate hydrochloride was effective at a dilution of between 1 to 500,000 and 1 to 1,000,000.

I claim:

1. A compound selected from the group consisting of (a) basic-alkyl esters of the formula

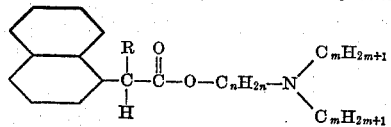

wherein R is selected from the group consisting of hydrogen and hydrocarbon radicals of the general formula $-C_wH_{2w+1}$, wherein $w$ represents an integer from 1 to 4, inclusive, $n$ is an integer from 2 to 4, inclusive, and $m$ is an integer from 1 to 4, inclusive, and (b) acid salts thereof.

2. A compound having the formula

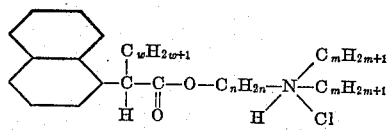

wherein $w$ represents an integer from 1 to 4, inclusive, $n$ is an integer from 2 to 4, inclusive, and $m$ is an integer from 1 to 4, inclusive.

3. Beta - diethylamino - ethyl alpha-(alpha-naphthyl)-normalbutyrate hydrochloride melting at 117°–119° C.

4. Gamma-diethylamino-propyl alpha-(alpha-naphthyl)-normalbutyrate hydrochloride melting at 97°–98° C.

FREDERICK F. BLICKE.

REFERENCES CITED

The following references are of record in the file of this patent:

UNITED STATES PATENTS

| Number | Name | Date |
|---|---|---|
| 2,079,962 | Miescher et al. | May 11, 1937 |

OTHER REFERENCES

Gilman et al. "Jour. Pharmocology and Exp. Therapeutics" Mar. 1942, pages 290–307.

Mayer et al. "Ber. der Deutschen Chem. Ges". Vol. 49, page 2139 (1916).